(No Model.) 2 Sheets—Sheet 1.

J. B. HAMILTON.
REED ORGAN.

No. 350,624. Patented Oct. 12, 1886.

Witnesses
S. N. Piper
R. B. Torrey

Inventor,
James B. Hamilton.
by R. H. Eddy, atty.

(No Model.)  2 Sheets—Sheet 2.

J. B. HAMILTON.
REED ORGAN.

No. 350,624.  Patented Oct. 12, 1886.

Witnesses.
S. N. Piper
J. E. B. Torrey

Inventor,
James B. Hamilton
by R. H. Eddy atty.

UNITED STATES PATENT OFFICE.

JAMES BAILLIE HAMILTON, OF WORCESTER, MASSACHUSETTS, ASSIGNOR TO THE HAMILTON VOCALEON ORGAN MANUFACTURING COMPANY, OF SAME PLACE.

REED-ORGAN.

SPECIFICATION forming part of Letters Patent No. 350,624, dated October 12, 1886.

Application filed July 8, 1886. Serial No. 207,433. (No model.)

*To all whom it may concern:*

Be it known that I, JAMES BAILLIE HAMILTON, a subject of the Queen of Great Britain, but residing at present in the city and county of Worcester, of the Commonwealth of Massachusetts, have invented a new and useful Improvement in Keyed Musical Instruments termed "Reed-Organs;" and I do hereby declare the same to be described in the following specification and represented in the accompanying drawings, of which—

Figure 1:
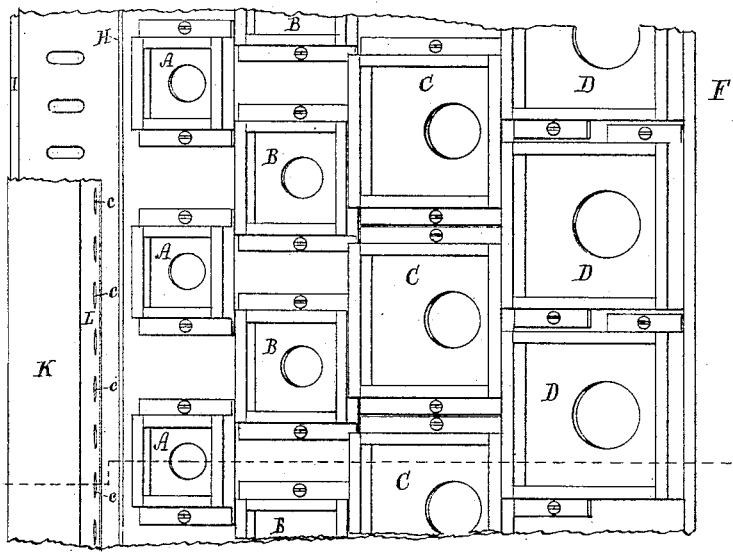
Figure 3:
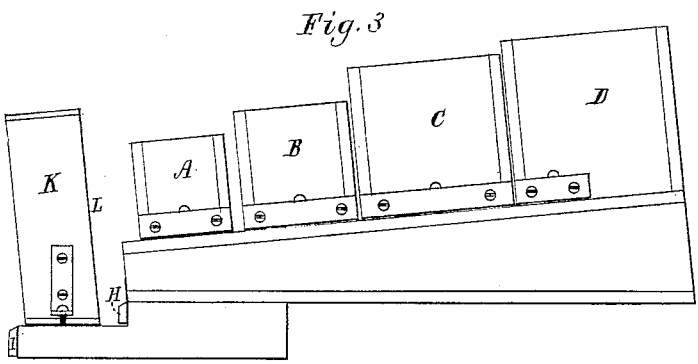
Figure 2:
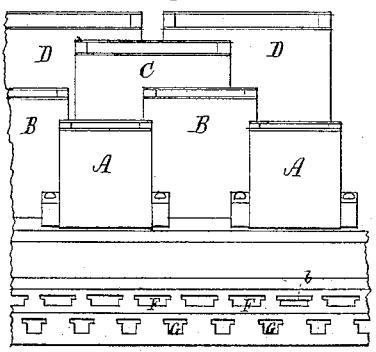
Figure 4:
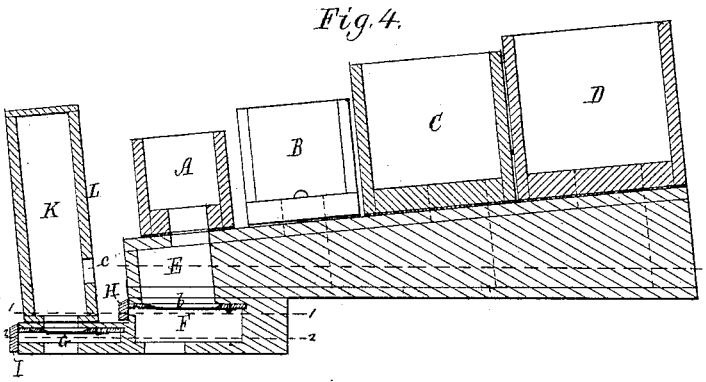
Figure 5:
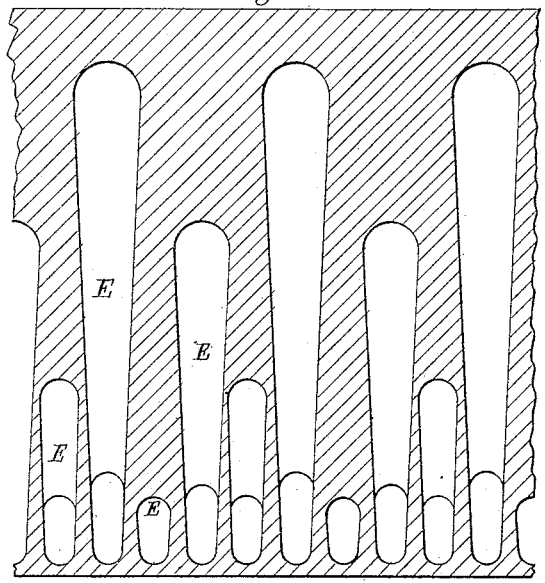
Figure 6:
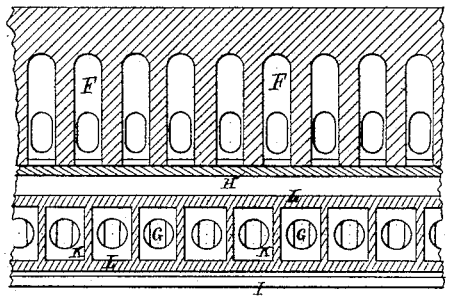
Figure 7:
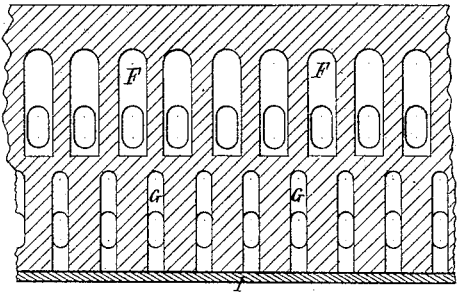

Figure 1 is a top view, Fig. 2 a front elevation, Fig. 3 an end view, and Fig. 4 a transverse section, of certain parts of a reed-organ embodying my invention. Fig. 5 is a horizontal section of the "phalanx-box." Fig. 6 is a horizontal section taken on line 1 1 of Fig. 4—that is, through the rear set of reed-chambers—while Fig. 7 is a horizontal section on line 2 2 of Fig. 4—that is, through the front set of reed-chambers.

My present invention relates to that shown and described in an application recently made by me for a patent, such application having been filed in the Patent Office on April 1, 1886, and having the serial number 197,406. The invention embraced in such application contained what was described as a "phalanx" or phalangal arrangement of pipes or pipe-receiving holes, with passages leading from them to a series or range of reed-chambers. In other words, the invention consisted in the combination of a range of reed-chambers open at their front ends, and there provided with a closing valve or cover, with a series of passages or channels leading from such reed chambers to several ranges or a phalanx of pipe-receiving holes, formed in a board over or covering such channels, and varying in their sizes or diameters. This invention necessarily required the organ-pipes used in the holes to be of full organ lengths, or approximately so, thereby rendering the instrument cumbersome in comparison to what it is under my present improvement, by which the pipes used are very short, comparatively speaking.

With my present invention I am enabled to obtain the useful results incident to the other with greater effectiveness, and also with a material diminution in the size of the instrument.

The phalangal arrangement shown in my aforesaid application for a patent had its reeds or reed-chambers in one single range or bank, to which it was limited, to effect which the scale of reeds selected was the narrowest usually practically admissible, being that known by organ-builders as the "half-inch scale." With my present invention I retain the phalanx or phalangal arrangement of the pipes for all the ranges of them except the front one, and instead of pipes of great lengths to such ranges I employ very short pipes, and use reeds broader than those of the said front range. Furthermore, the front range of reed-chambers I have in a bank disposed below and in front of the reed-chambers of the phalanx, and I have the reed-chambers of each set open at their front ends, and each there provided with a closing flap or valve, and the front range of pipes I make removable in a body from the front of the upper set of reed-chambers, or have them so hinged to the part containing the lower set of such chambers as to be capable of being turned down, to enable a person to readily gain access to any one of the upper set, for the purpose of removing a reed therefrom or of introducing one into it, as occasion may require.

The drawings show the phalangal arrangement of four ranges of pipes, those of the first range being marked A, those of the next one B, those of the third one C, and those of the fourth one D, the pipes of each range varying in height and horizontal cross-section, or being smaller than those of the range directly next and in rear. These pipes open into passages E, leading to the rear bank of reed-chambers, F, each of which is not only broader than a reed-chamber, G, of the front bank, but is provided with a correspondingly or much broader reed, *b*, by the use of which I am enabled to employ therewith a very short pipe relatively to what I could were all the reed-chambers disposed in one range only. The front reed-chambers, G, of the front bank are in advance of and of less depth than those of the rear bank, the latter, in the part extending above the front bank, being open at their front ends, and there provided with a closing flap or valve, H, hinged so as to admit of its being turned away from the mouths of such chambers. The front reed-chambers, G, are also open at their front ends, and are there provided with a flap or valve, I, to close or uncover them, as circumstances may require. The front or first range, K, of pipes—that is, those of the reed-chambers G—is situated directly over such chambers, each pipe opening into the chamber immediately below it. These pipes are a series of chambers or divisions of a box, L, which is separate from and fastened or hinged to the front bank, so as to be capable of being removed therefrom directly in front of the flap or valve of the mouths of the rear bank of reed-chambers, as occasion may require. Each chamber or division of the box L has an opening or mouth, $c$, for the escape of air from it, such opening being in proportion to the tone required.

I do not herein claim the combination of a series or range of reed-chambers open at their front ends, and there provided with a closing flap or valve, with a series of passages or channels leading from such reed-chambers to several ranges or a phalanx of pipes or pipe-receiving holes in a board or covering of such channels or passages, and varying in their sizes or diameters.

I claim—

In combination with a range of reed-chambers open at their front ends, and there provided with a closing flap or valve or devices, and with a series of passages or channels leading from such chambers and a phalanx or several ranges of pipes extending over and communicating with such passages, an auxiliary series of reed-chambers disposed in front of and below the mouths of the front set of reed-chambers and open at their front ends, and there provided with closing devices or a flap or door, as described, such auxiliary set of reed-chambers having a set of pipes, or their equivalent, arranged over and opening out of them, and so connected to the bank on which they are placed as to be readily removable from the front of the first set of reed-chambers, as explained.

JAMES BAILLIE HAMILTON.

Witnesses:
R. H. EDDY,
R. B. TORREY.